June 19, 1934.  E. W. LITTLE  1,963,414
REMOVABLE BOTTOM FOR CAGES
Filed Jan. 14, 1932    3 Sheets-Sheet 1
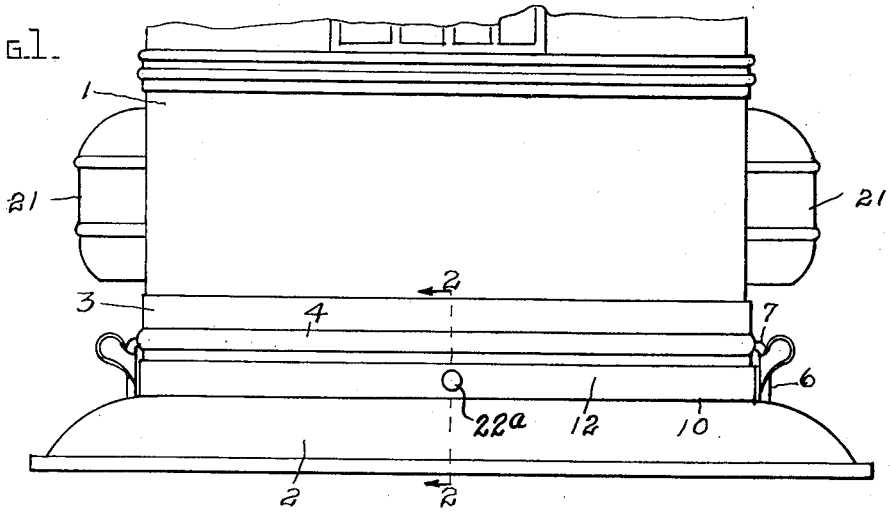
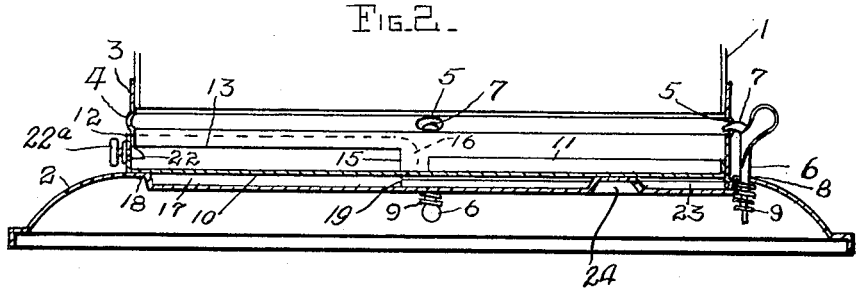
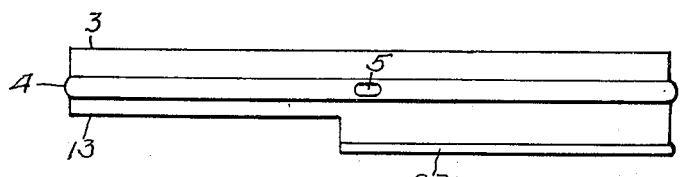
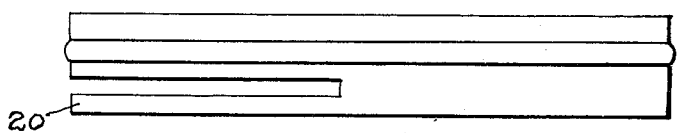
INVENTOR:
Earl W Little June 19, 1934.    E. W. LITTLE    1,963,414
REMOVABLE BOTTOM FOR CAGES
Filed Jan. 14, 1932    3 Sheets-Sheet 2
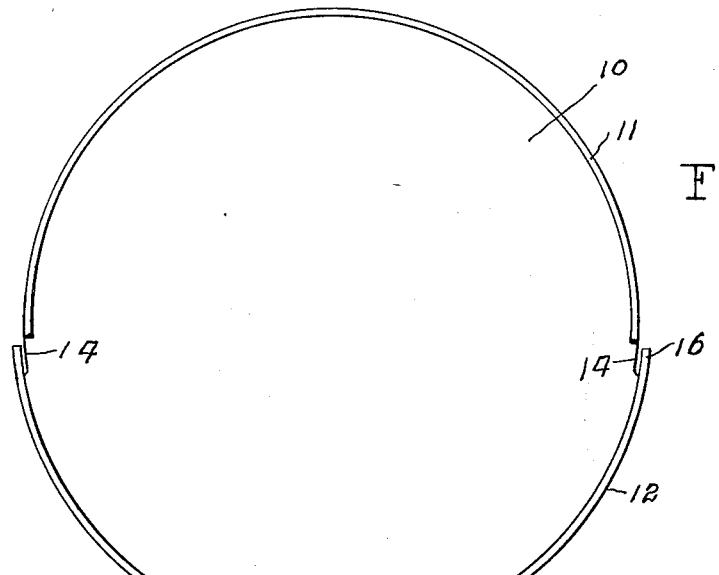
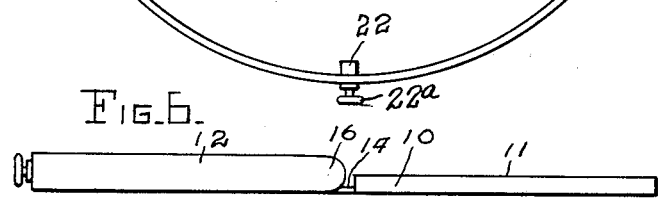
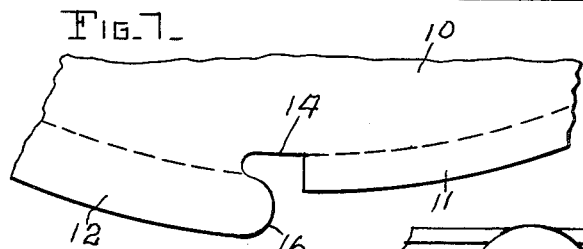
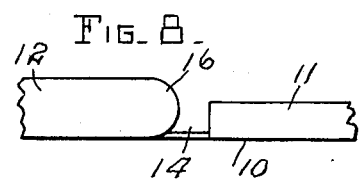
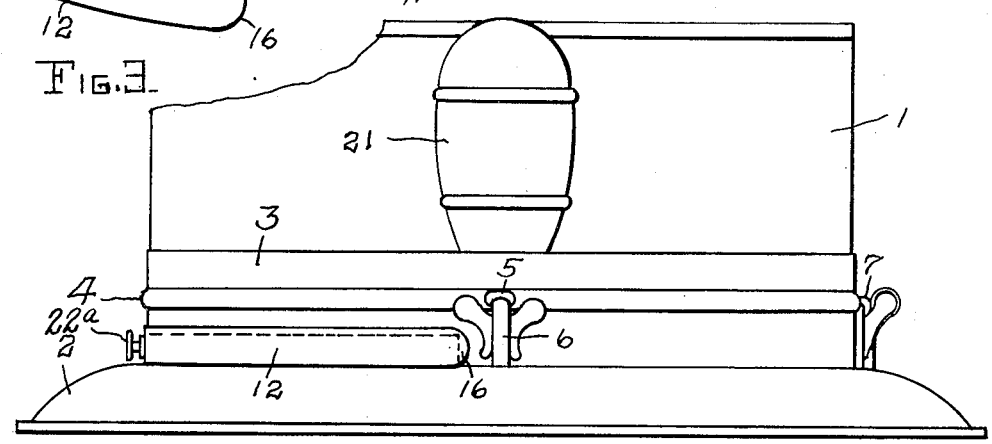
INVENTOR:
Earl W. Little June 19, 1934.    E. W. LITTLE    1,963,414
REMOVABLE BOTTOM FOR CAGES
Filed Jan. 14, 1932    3 Sheets-Sheet 3
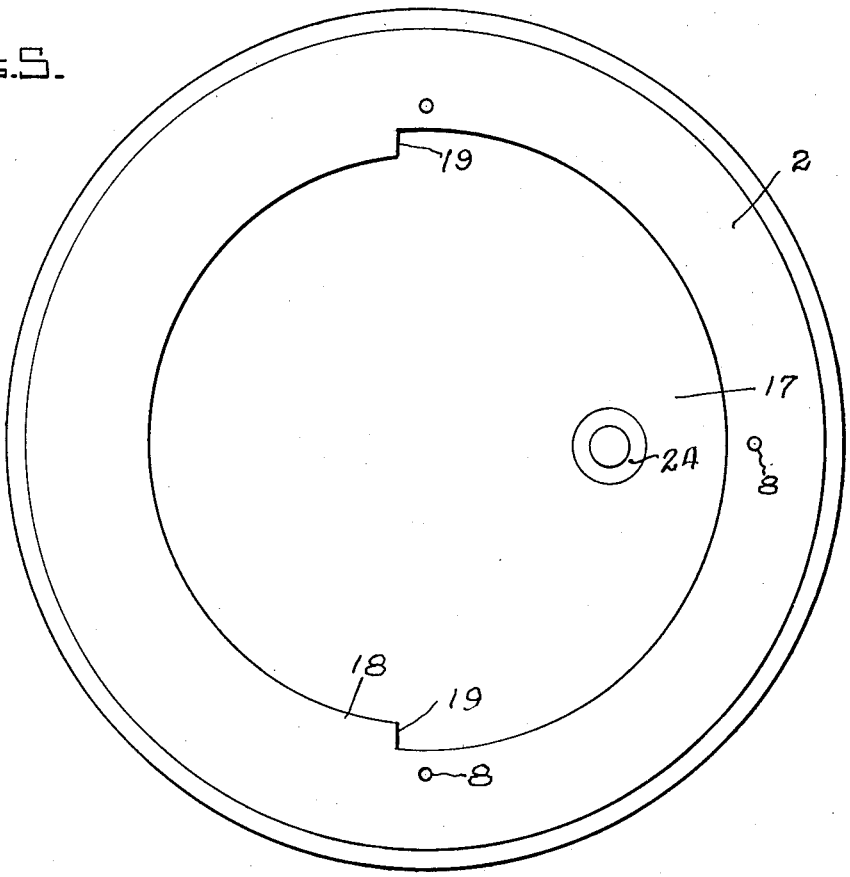
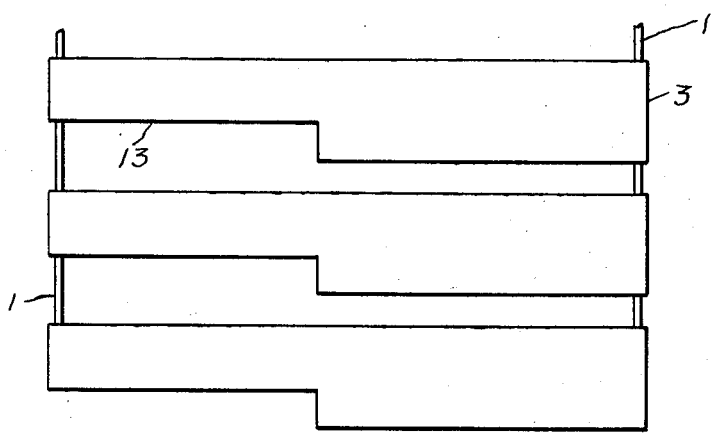
INVENTOR:
Earl W Little Patented June 19, 1934

1,963,414

UNITED STATES PATENT OFFICE 1,963,414

REMOVABLE BOTTOM FOR CAGES

Earl W. Little, Indianapolis, Ind.

Application January 14, 1932, Serial No. 586,492

9 Claims. (Cl. 119—17)

This invention relates to removable bottoms for cage structures and is particularly designed for use in connection with bird cages and the like and one feature of the invention is the provision of a recess or passage way in the lower edge of the cage body for the entrance or removal of the removable bottom without disturbing the remainder of the cage.

A further feature of the invention is in so constructing the recess in the cage body that a number of the cage bodies may be nested together for shipping purposes and afterward separated without undue binding between the parts of the cage bodies and without bending any of the parts of the cage structures.

A further feature of the invention is the provision of notches at opposite sides of the removable bottoms for engagement with the end walls of the recess in the lower edge of the cage body to guide the bottom into position as well as interlock parts thereof with the cage body.

A further feature of the invention is in so constructing the notches in the removable bottom that any water or liquid deposited upon the removable bottom will readily pass therefrom onto the main bottom of the cage structure and through which offal may readily be removed from the removable bottom without tilting the same.

A further feature of the invention is in so constructing the main bottom of the cage structure that the end walls of the cage body will interfit therewith and positively position the cage body for entering the notches in the edges of the removable bottom as the removable bottom is entered through the recess in the bottom edge of the cage body.

A further feature of the invention is the provision of means for reinforcing the lower edge portion of the cage body to prevent that portion thereof entering the main cage bottom, from becoming bent or mutilated.

In the drawings:

Figure 1 is an elevation of the lower portion of a cage structure showing the removable bottom in position therein. Figure 2 is a detail sectional view as seen along line 2—2, Fig. 1.

Figure 3 is an elevation at right angles to that shown in Fig. 1.

Figure 4 is a top plan view of the removable bottom.

Figure 5 is a top plan view of the main cage bottom.

Figure 6 is an edge elevation of the removable bottom.

Figure 7 is an enlarged plan view of a portion of the removable bottom while in blank form showing the manner of forming the notches therein.

Figure 8 is an edge elevation of the same parts in assembled formation.

Figure 9 is a side elevation of a band for surrounding the lower portion of the cage body.

Figure 10 is a similar view of a different form of band.

Figure 11 is a diagrammatic view of a plurality of nested cage bodies.

Referring to the drawings in which similar reference numerals designate corresponding parts throughout the several views, the numeral 1 designates a cage body and 2 indicates the main bottom therefor, which are designed in this instance as a bird cage.

Surrounding the lower edge portion of the cage body 1 is a band 3, preferably of metal, which is secured to and made a part of the body 1 in any conventional manner, said band having an encircling reenforcing rib 4, in which are formed slots 5 for the reception of locking latches 6.

The locking latches 6 each have a finger 7 at its upper extremity, designed to enter the slots 5 and hold the bottom 2 in position over the lower end of the body 1, the lower portions of the latches passing downwardly through openings 8 in the bottom 2. A coiled spring 9 is introduced over that portion of each latch extending below the wall of the main bottom 2 and is secured thereon in any suitable manner, so that when the latch is elevated and the finger 7 engaged with its respective slot 5, the spring will be tensed and the bottom permanently locked with the cage body 1 until such time as the finger is again released from its slot 5.

In order to remove offal from the cage structure without removing the main bottom 2, a removable bottom 10 is provided, the peripheral edge of which is provided with vertical flanges 11 and 12, the flange 11 being of less diameter and less height than the flange 12, the flange 11 passing within the cage body 1 and fitting the contour of the inner face of the band 3, while the flange 12 remains exteriorly of and fits the contour of the outer face of the band.

In order to readily enter or remove the removable bottom 10, without releasing the main bottom 2, the lower edge of the band 3 is partially cut away to form a recess 13, through which the removable bottom 10 may be slid when entering the bottom 10 into or removing the same from the cage.

In order to interlock the removable bottom with the cage body 1, the peripheral edge of the removable bottom 10 is provided at diametrically opposite points with substantially bayonet socket shaped notches 14, into which take the end walls 15 of the recess 13, the flange 12 having flaps 16 at its ends, formed by cutting the notches 14, which overlap the face of the band 3 at the ends of the recess 13.

In order to positively position the cage body 1 upon the main bottom 2 so that the slots 5 will be in registration with the latches 6, and the end walls of the recess 13 in positive position to enter the notches 14, a depression 17 is formed in the wall of the main bottom 2, into which the lower edge of the body 1 fits, that portion of the bottom 2 immediately below the recess 13, having a ledge 18, upon which that portion of the removable bottom 10, having the flange 12, rests when the bottom 10 is positioned within the cage body 1.

Shoulders 19 are formed at the ends of the ledge 18 against which take the lower portions of the end walls 15 of the recess 13, and when so positioned said end walls will be in positive position to enter the notches 14, when the bottom 10 is entered into the cage body. The shoulders 19 also prevent the cage body 1 from slipping or moving around on the main bottom 2.

Heretofore the recess for receiving the removable bottom has been constructed as shown in Fig. 10, but it was found, that, when the cage bodies were nested together for shipping purposes, as indicated in Fig. 11, the narrow portion 20 would frictionally engage with the parts of the cage over which it was nested with the result that the part 20 would be so bent and distorted as to greatly mar the appearance of the cage, if not entirely spoil the cage. By omitting the narrow portion 20, as is shown in this invention, the cage bodies may be very easily nested or separated without affecting the shape of the cage body and a greater number of the bodies may be nested than is possible where the old form of cage body is used.

The feed and water cups 21 are so located that they will register practically directly above the notches 14, so that any water splashed or otherwise removed from the water cup will flow through the notches 14 and enter the depression 17 in the main bottom 2 so that the water will not be spilled when the bottom 10 is removed from the cage. It will likewise be seen that as the lower edges of the notches 14 are substantially flush with the floor of the bottom 10, any offal may be readily brushed from the bottom 10 through the notches 14 without tipping the bottom or turning the same over.

To positively insure against the body 1 of the cage tilting through yielding of the springs 9 on the latches 6, the flange 12 is provided with a support 22, which, when the bottom 10 is inserted into the cage, passes beneath the top edge of the recess 13 so that the cage body will be firmly held in upright position so long as the bottom 10 remains within the cage. A portion of the support 22 passes through the flange 12 and is provided with a pull knob 22a which may be grasped for removing the bottom 10 from the cage.

In order to reinforce the lower edge of the band 3, or rather the part thereof that enters the depression 17, said edge is provided with a reinforcing rib 23 at its lower extremity, which prevents the edge of the band becoming bent or otherwise injured. The inner edge of the removable bottom 10 is supported upon a rest 24, preferably formed by striking up a portion of the main bottom 2, as best shown in Figs. 2 and 5.

What I claim is:

1. The combination with a cage body, a band having a recess formed by cutting out a portion of the lower edge thereof and part way of the circumference of the band, and a main bottom connected with said cage body and forming the lower wall of said recess, of a removable bottom adapted to be passed through said recess and rest over said main bottom, and flanges on said removable bottom having notches therethrough for engagement with the walls at the ends of said recess.

2. The combination with a cage body, a band surrounding the lower edge of said cage body having a recess extending upwardly from the lower edge thereof, and a main bottom connected with said band, said main bottom forming the lower wall of said recess, of a removable bottom adapted to be passed through said recess and rest on parts of said main bottom, upwardly extending flanges on said removable bottom having their ends separated to form notches, said notches receiving and interlocking with the end walls of said recess.

3. The combination with a cage body, and a band surrounding said cage body, said band having a recess extending upwardly from the lower edge thereof, of a removable bottom for entrance in said recess, said removable bottom having substantially bayonet socket shaped notches in its edges for engagement with the end walls of said recess.

4. The combination with a cage body, a band having a recess in the lower extremity thereof, and a main bottom member secured to said cage body, of a removable bottom adapted to be entered through said recess, upwardly extending flanges on said removable bottom having their ends separated to form notches, said notches being flush with the bottom wall of said removable bottom, whereby water and offal may be removed from said removable bottom without tilting the bottom.

5. The combination with a cage body, of a band surrounding the lower extremity of said cage body, one portion of the band being greater in depth than the remainder thereof to form a recess at the shorter side thereof, and a reinforcing rib on the band.

6. The combination with a cage body, of a band having a recess at its lower edge, and a rib surrounding said band, said rib having openings for the reception of fastening means.

7. The combination with a cage body, of a band surrounding the lower extremity of said cage body and fixed thereto, one portion of the band having a greater depth and one portion a lesser depth to form a bottomless walled recess beneath that portion thereof having a lesser depth, and a base upon which that portion of the band having the greater depth rests when the body is rested upon the base.

8. The combination with a cage body, a band having a notch cut in the lower end thereof to form a bottomless recess, of a base portion upon which the unnotched portion of said band rests when positioned over said bottom, and a removable bottom adapted to be entered through said recess and rest on said main base, whereby said body may be removed from its base without disturbing the removable bottom.

9. In a cage structure, a base portion, and a removable bottom adapted to rest on said base portion, a cage body, and a band surrounding the lower extremity of said cage body and fixed thereto, said band having a notch cut in the lower edge thereof forming a portion of the band of a greater depth, and a portion of a lesser depth, and forming a recess beneath that portion of the band having the lesser depth through which said removable bottom may be passed, that portion of the band having the greater depth forming the main support for the cage body when rested on said base portion.

EARL W. LITTLE.